United States Patent
Todd

[15] 3,667,159
[45] June 6, 1972

[54] SEEDLING FLAT

[72] Inventor: George K. Todd, 2019-74th Street Circle, Shaw's Point, Bradenton, Fla. 33505

[22] Filed: Sept. 10, 1970

[21] Appl. No.: 71,011

[52] U.S. Cl. ............................47/34.13, 209/2.5, 220/21
[51] Int. Cl. ..........................................A01g 9/02
[58] Field of Search................47/34, 34.13, 37, 8.1, 1.2; 141/331, 24; 222/460; 220/21, 46 FC; 209/2.5

[56] References Cited

UNITED STATES PATENTS

| 2,988,441 | 6/1961 | Pruitt | 47/37 X |
| 3,561,158 | 2/1971 | Marcan | 47/34.13 |

FOREIGN PATENTS OR APPLICATIONS

| 1,268,626 | 6/1961 | France | 47/34.13 |
| 737,660 | 9/1955 | Great Britain | 47/34.13 |
| 1,437,556 | 3/1966 | France | 47/34.13 |

Primary Examiner—Robert E. Bagwill
Attorney—Mason, Fenwick and Lawrence

[57] ABSTRACT

A seedling flat is provided in a first embodiment in the form of a unitary plastic member having downwardly extending square tapered soil receiving recesses in which individual seedlings are started with one embodiment employing a unitary polystyrene foamed plastic; a second embodiment is embodied in a construction formed of rigid plastic plate members connected together in a unitary manner.

6 Claims, 5 Drawing Figures

INVENTOR
GEORGE K. TODD
BY Mason, Fenwick & Lawrence
ATTORNEYS

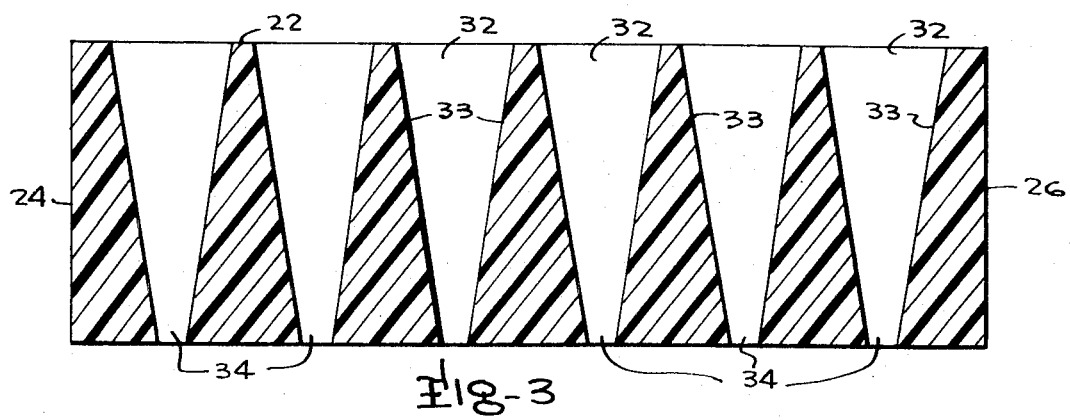
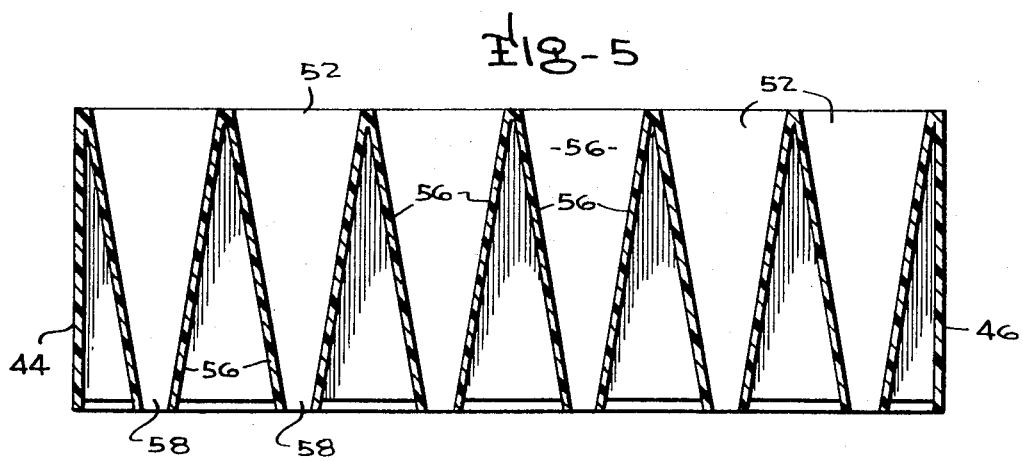
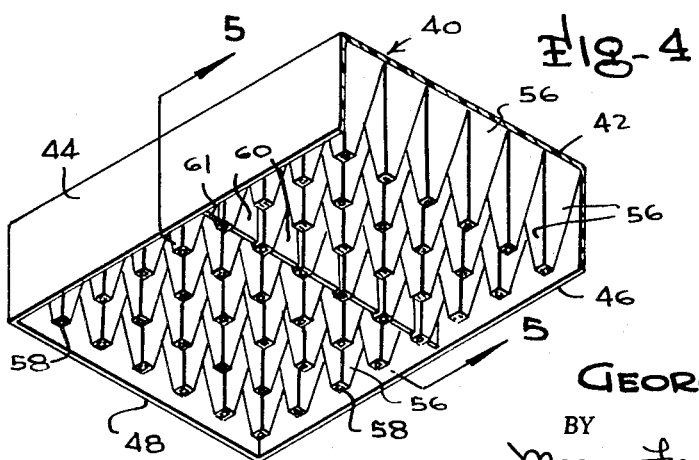

SEEDLING FLAT

This invention is in the field of horticultural containers and is specifically directed to the field of seedling flats of the type in which seeds are planted for initial growth into a seedling to be subsequently transplanted in a field. Even more specifically, the subject invention is directed to a seedling flat that is completely reusable but is economical to initially construct and maintain.

Large scale farming operation for crops such as tomatoes, cauliflower and the like entail the necessity for transplanting millions of seedlings each year. Such seedlings are normally started from seeds in a controlled environment such as a hothouse or the like and, upon reaching a desired size, the seedlings are transplanted for field growth.

The extremely large number of seedlings transplanted each year has resulted in the fact that even a savings of a fraction of a cent per seedling will result in a substantial increase in the profits of both the farmer and/or the seedling producer.

One of the greatest cost factors in providing seedlings for transplantation is the labor involved in handling and delivering the seedlings to the user. Specially designed trays for holding the individual seedling pots and the like have consequently been proposed and used for this purpose. Normally, such support members are usable with only one particular type of seedling container and are not compatible with other containers of different size, shape and dimension.

Another problem with many of the presently known seedling container systems is that the seedlings must be removed from the container prior to transplantation. Such removal is sometimes quite difficult and frequently results in damage or injury to the seedlings, not to mention the labor costs involved in the removal of the seedlings from such containers for transplantation. Consequently, a number of seedling containers have been proposed in recent years in which the containers are made of a plantable material that is directly transplanted into the ground along with the seedlings with there being no need for removal of the seedlings from the container. While devices of this type have been fairly satisfactory, they do not possess the necessary rigidity to be easily handled without the aid of additional auxiliary support trays or the like. In fact, many non-plantable seedling containers are also so weak and fragile as to require the use of such supplemental containers or supports.

Moreover, when devices of the plantable type are in a wet condition, they are extremely flimsy and subject to easy tearing and damage.

However, probably the greatest drawback of devices of the plantable type is that of high initial cost. Moreover, such devices obviously are not reusable and are consequently all the more expensive.

The foregoing facts have resulted in the introduction of many different designs of seedling flats or containers in recent years.

Therefore, there has hitherto remained an unmet need for a reusable, economical and sturdy seedling flat requiring no auxiliary equipment for handling and having the capacity of permitting the easy removal of seedlings from the flat. For these reasons, it is the primary object of this invention to provide a new and improved seedling flat.

Obtainment of the object of this invention is enabled through the provision of a seedling flat formed of a unitary body member of plastic having an upper surface from which downwardly extending seedling recesses are provided. The seedling recesses are of square shape and tapered downwardly to a lower termination in an opening which provides for drainage during use of the flat. In one embodiment of the invention, the body member is formed of foamed polystyrene while in the other embodiment, the body member is formed of rigid plastic plate members.

A better understanding of the subject invention will be enabled through a reading of the following written description in conjunction with an inspection of the attached drawings in which:

FIG. 3 is a sectional view taken along lines 3—3 of FIG. 1;

FIG. 4 is a bottom view of a second embodiment with portions removed to illustrate the internal construction; and FIG. 5 is a sectional view taken along lines 5—5 of FIG. 4.

Figure 1:
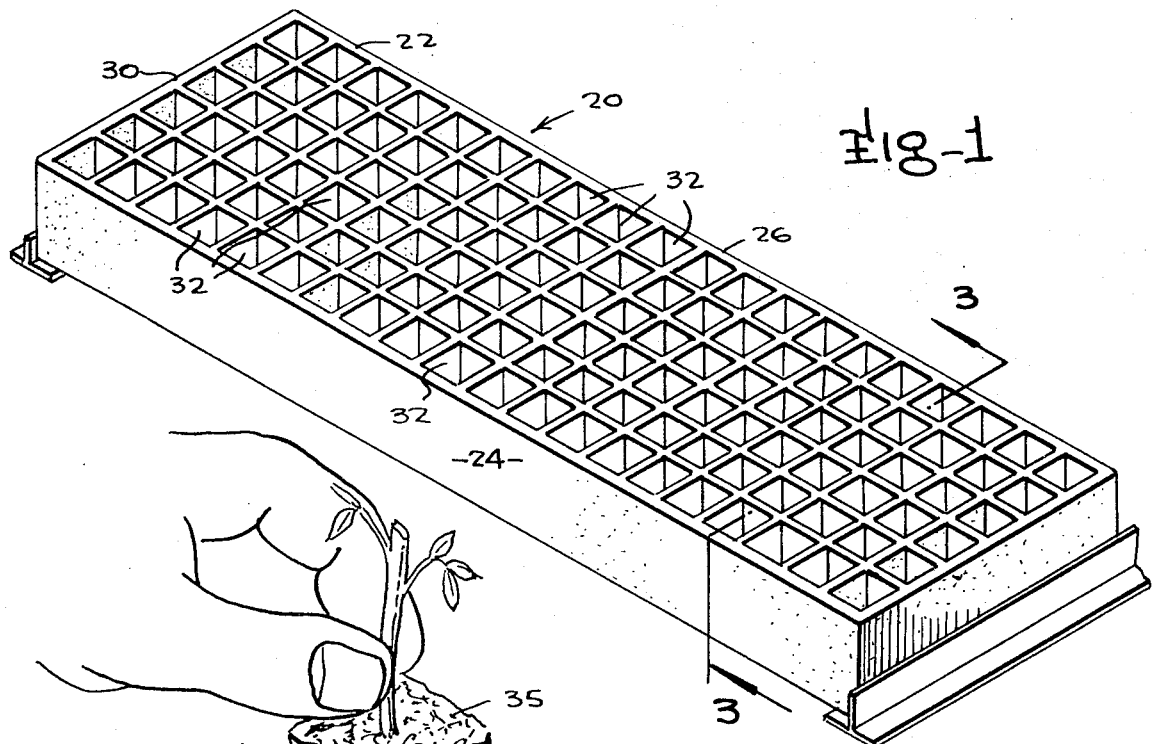
FIG. 1 is a perspective view of a preferred embodiment of the invention.

Attention is initially invited to FIG. 1 of the drawings which illustrates a first embodiment of the invention in the form of a solid foamed polystyrene body member 20 having an upper surface 22, first and second side walls 24 and 26 respectively and first and second end walls 28 and 30 respectively.

A plurality of seedling planting cells 32 are provided to extend downwardly from the upper surface 22. Planting cells 32 are formed of downwardly extending wall means 32 which taper inwardly from top to bottom and which have a lower termination at a lower opening 34 defined by the lower edge of wall means 33. Each planting cell 32 is of squared configuration and tapers downwardly as shown in FIG. 2 to terminate in one of the openings 34.

A potting medium 35 is placed in each of the planting cells and is seeded in a conventional manner. When given adequate sunlight and moisture, the seedling rapidly grows to a desired size.

It has been found that seedlings planted in the inventive flats of this application do not become root bound as is the case in seedlings planted in the many previously known containers. This is true because the ends of the flat are supported by the flanges of T-shaped beams as shown in FIG. 1 during growth and also during transportation so that the openings 34 in the bottom of each of the seedling receiving recesses are open to light and air. Consequently, the roots merely grow downwardly in the shape shown in FIG. 2 and do not continue to grow around the wall of the container to choke further growth. Consequently, such seedlings can easily initiate growth following transplantation since the roots are not tightly entwined in a relatively solid mass. This fact will be easily appreciated from an inspection of FIG. 2.

Figure 2:
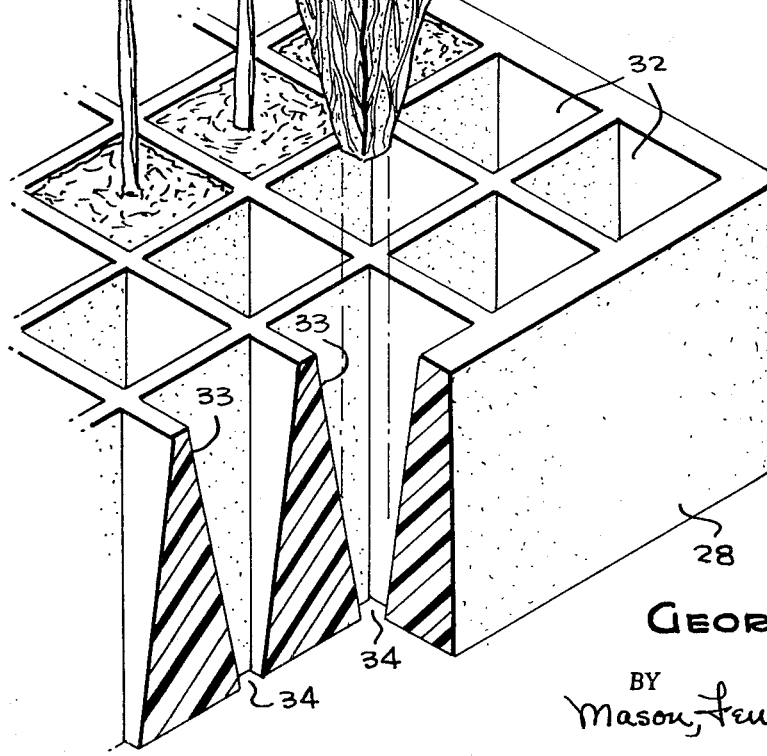
FIG. 2 is an enlarged view of a portion of the device of FIG. 1 with parts removed to illustrate the internal construction.

FIGS. 4 and 5 illustrate a second embodiment of the invention in the form of a body member 40 formed of a plurality of rigid plastic plate components as contrasted to the foamed polystyrene body member 20 of the embodiment of FIGS. 1–3. Body member 40 has an upper surface 42 and is also provided with first and second side walls 44 and 46 respectively. Additionally, the body member 40 is also provided with end walls 48 (only one of which is illustrated) which define the peripheral extent of the body member.

A plurality of downwardly extending seedling receiving planting cells 52 extend downwardly from the upper surface 42 in a manner illustrated in FIG. 5. Each of the seedling receiving openings 52 is formed of four wall plates 56 which taper downwardly uniformly and terminate adjacent their lower ends in an opening 58.

Therefore, it will be seen that the interior of the body member is largely open spaced as viewed from beneath the body member since the wall plates 56 are in the form of protrusions as viewed from that position.

Rigidity and strength are imparted to the embodiment of FIGS. 4 and 5 by the provision of a plurality of triangular brace plates 60 extending between adjacent side plates of the adjacent recesses defined by the side plates. Additionally, smaller triangular brace plates 61 can be provided between the outer row of wall plates and the side walls 44, 46 as shown in FIG. 4.

The ends of the body member 40 are easily supported on the flanges of T-shaped beam members in the same manner as the previously discussed first embodiment. The plants are easily removable in the same manner and the flat is consequently reusable a large number of times.

Both embodiments of the subject invention are remarkably durable and enable the easy manual removal of plants as shown in FIG. 2 of the drawings. Moreover, both embodiments are easily transported to and from a planting site and are reusable many times.

Many variations in the subject invention will occur to those skilled in the art; however, it should be understood that the spirit and scope of this invention should be defined solely by the appended claims.

I claim:

1. A planting flat comprising a body member having a plurality of open-ended, downwardly tapering planting cells extending downwardly from a common upper plane and having a lower termination in a common lower plane, said cells being defined by wall means of substantially straight configuration converging inwardly from top to bottom so that said planting cells terminate at their lowermost extent in a lower opening defined by the lower ends of said wall means, said lower openings being small enough to retain planting media in said cells, but large enough to permit drainage of said cells.

2. The invention of claim 1 wherein said planting cells are of squared configuration having four inwardly tapering walls.

3. The invention of claim 2 wherein said flat is formed of a unitary piece of molded foam polystyrene.

4. The invention of claim 2 wherein each of said planting cells are formed of four downwardly tapering rigid side plates defining a lower drain opening at their lowermost extent.

5. The invention of claim 4 additionally including triangular brace plates connecting adjacent side plates of different cells.

6. The invention of claim 5 wherein said cells are bounded by side and end walls formed of thin plates of rigid plastic material.

* * * * *